May 20, 1924.
L. M. ADAMS
CONTINUOUS FLOW WATER HEATER
Filed March 3, 1923
1,494,326
2 Sheets-Sheet 2
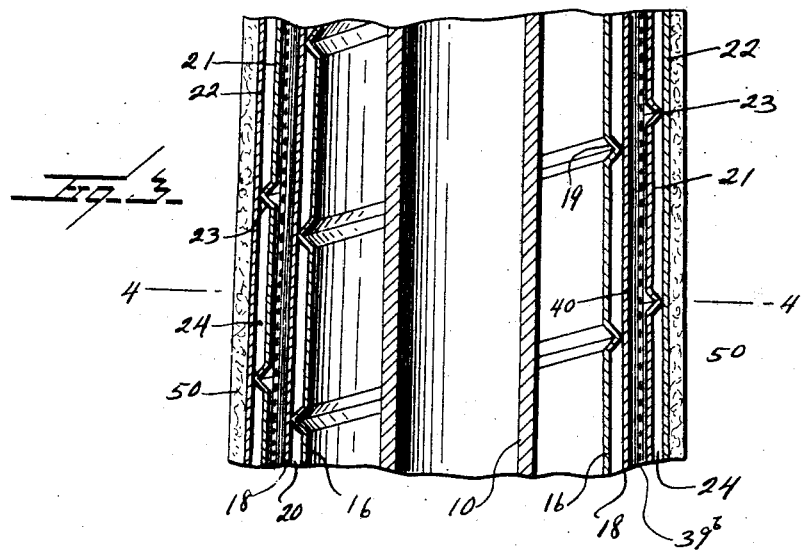
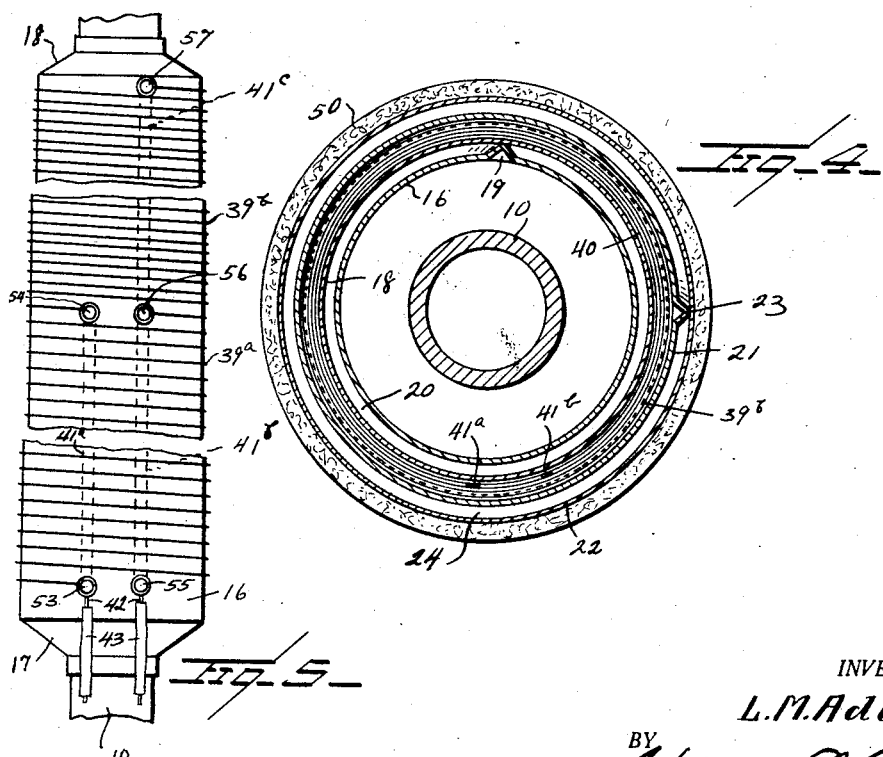
INVENTOR.
L. M. Adams
BY Watson E. Coleman
ATTORNEY.

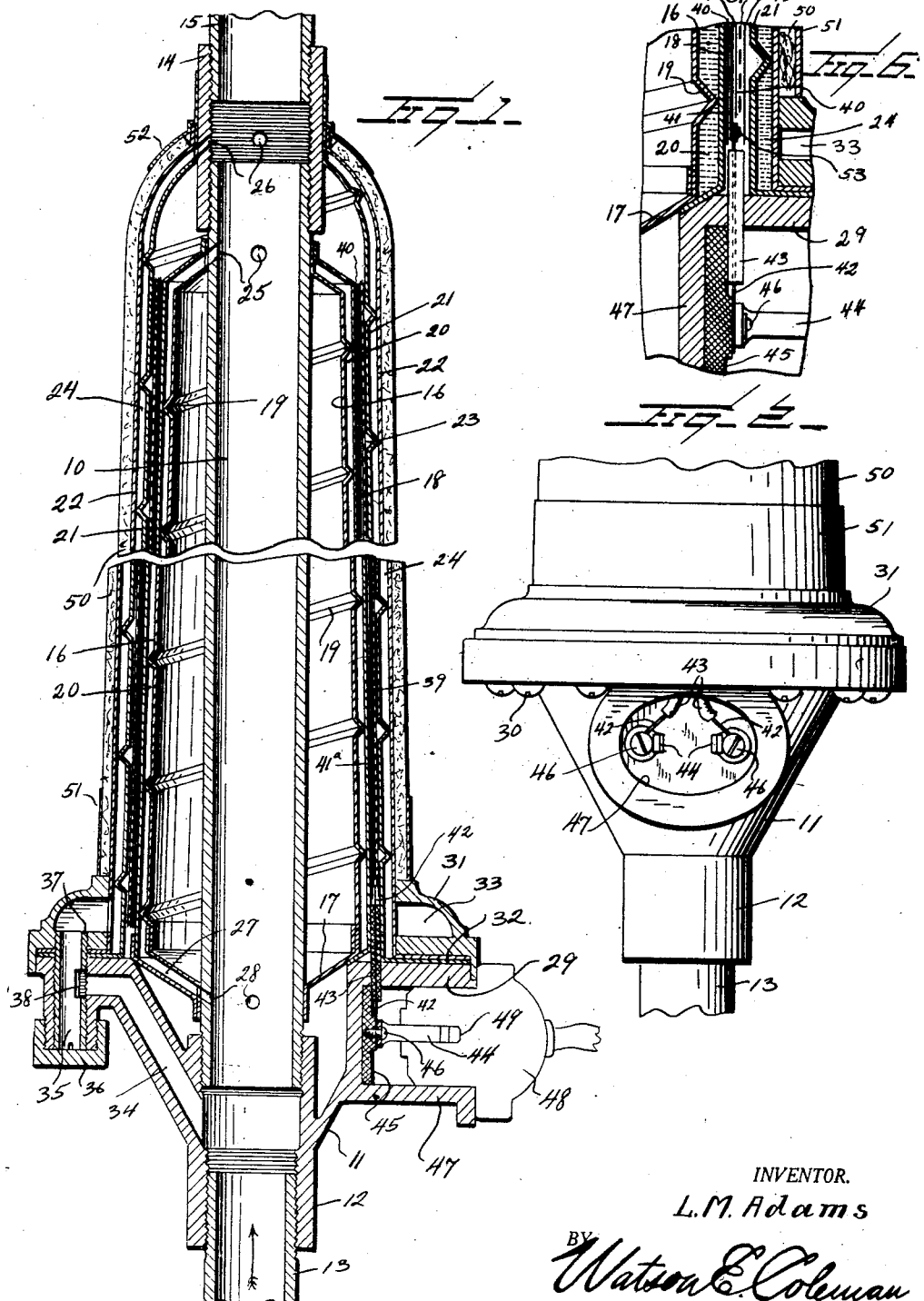

Patented May 20, 1924.

1,494,326

UNITED STATES PATENT OFFICE.

LESLIE M. ADAMS, OF SEATTLE, WASHINGTON.

CONTINUOUS-FLOW WATER HEATER.

Application filed March 3, 1923. Serial No. 622,608.

*To all whom it may concern:*

Be it known that I, LESLIE M. ADAMS, a citizen of the United States, residing at Seattle, in the county of King and State of Washington, have invented certain new and useful Improvements in Continuous-Flow Water Heaters, of which the following is a specification, reference being had to the accompanying drawings.

This invention relates to water heaters, and particularly to that type of water heater wherein the water or other liquid to be heated passes through a channel, one or both walls of which in turn are heated by an electric element.

The general object of this invention is to provide a water heater of this character which is so constructed as to allow of a free flow of water through a tubular conduit forming part of the heater, which is provided with water heating chambers and which has means whereby a portion of the water flowing through the tubular element may be directed into said heating chamber or chambers and the steam generated thereby carried back into the main stream of water to heat the same.

A further object is to provide a construction of this character which includes two cylindrical approximated shells spaced from each other a slight distance, and so formed as to provide a helical passage extending from the inlet to the outlet end of the shells so that the water or other liquid traveling through said passage will be caused to take a spiral path and thus have maximum contact with that portion of the shell which is next to the heating element.

A still further object is to provide a construction of this character which will cause a rapid circulation of the water and will secure a relatively high degree of efficiency in proportion to the amount of electric energy expended.

Other objects have to do with the details of construction and arrangement of parts whereby to provide a heater which is compact, has a relatively high degree of efficiency, and in which the flow of water is relatively free.

My invention is illustrated in the accompanying drawings, wherein:—

Figure 1 is a vertical diametrical sectional view through my improved water heater;

Figure 2 is a fragmentary elevation of the lower portion of the base;

Figure 3 is an enlarged fragmentary diametrical sectional view through the upper portion of the heater;

Figure 4 is a transverse section on the line 4—4 of Figure 3;

Figure 5 is a fragmentary elevation of the shell 18, showing diagrammatically the manner in which a heating coil is wrapped around this shell and arranged thereon;

Figure 6 is a fragmentary vertical section on an enlarged scale through a portion of the socket 47, the outer and inner pairs of shells, and the heating element;

Referring to these drawings, 10 designates a central, tubular member constituting a water pipe and which has screw-threaded engagement at its lower end with the base of the heater, designated generally 11, which base has a tubular extension 12 communicating with a cold water inlet pipe 13. The upper end of the tubular member is connected by a coupling 14 with an outlet pipe 15.

The base 11 of the heater is approximately annular in plan and of a construction which will be hereafter more fully stated. Surrounding the pipe 10 but spaced therefrom any desired distance is an approximately cylindrical shell 16 which extends upward from the base nearly to the upper end of the pipe 10, this shell at its lower end fitting within a substantially conical cap 17. At its upper end this inner shell extends upward and centrally to the pipe and is engaged therewith in any suitable manner. Outward of the inner shell 16 is an outer cylindrical shell 18, which at its lower end is connected to the conical cap 17 and at its upper end extends inward and upward to the pipe 10 and the inner shell 16 is formed with a spiral corrugation 19 which is outwardly bulged and engaged with the inner surface of the shell 18 and thus a helical chamber 20 is formed, which helical chamber extends from the lower end of the cylindrical member 16 to the upper end thereof.

Disposed concentrically to the shells 16 and 18 and spaced therefrom are a pair of concentric shells 21 and 22 which extend from the base upward above the shells 16 and 18 and at their upper ends are curved inward toward and into approximate contact with the coupling 14. The shell 21 is formed with a helical corrugation 23 so that a helical compartment 24 is formed which extends from the lower ends of the shells upward to the upper end thereof. These chambers 20 and 24 constitute water heating chambers wherein water is vaporized. The chamber 20 at its upper end opens into the upper end of the pipe 10 by means of ports 25, while the chamber 24 opens at its upper end into the interior of the coupling 14 by means of ports 26. The lower end of the chamber 20 is connected to the lower end of the pipe 10 by means of passages 27 and ports 28. It will be understood, of course, that the coupling 14 constitutes a mere extension of the pipe 10 so that the ports 25, 26 and 27 open into the main fuel stream.

The base 11 is formed with an annular face 29, and resting upon this face and held thereto by screws 30 is an annular casting 31, which casting fits against the outer wall or shell 22. The lower ends of the outer pair of shells 21 and 22 are angularly flanged at 32 and the base of the casting 31 rests upon this flange and thus assists in holding the two shells in place upon the base. The casting 31 is formed to provide an annular chamber 33 and the base 11 is formed to provide a by-pass duct 34 which opens at its lower end into the central bore of the coupling 12. This by-pass at its upper end opens into a vertical passage 35 formed in the base. The wall of this passage is exteriorly screw-threaded at its lower end and normally closed by a cap 36.

Disposed within this bore or passage 35 is a vertically extending pipe 37 screw-threaded for its entire length and having a port 38 communicating with the duct 34. This pipe has screw-threaded engagement with the base of the casting 31 and opens into the chamber 33. Thus a portion of the water from the pipe 13 flows off through this by-pass 34 and thence into the chamber 33 and from thence into the helical chamber 24 formed between the outer and inner cylindrical portions 20 and 21. A portion of the water flowing through the pipe 10, as before stated, also passes into the ports 28 and so into the helical chamber formed between the inner pairs of shells 16 and 18.

Disposed between the shell 18 and the shell 21 is an electrical heating element. I do not wish to be limited to any specific form for this element. The heating element is designated 39 and is shown as helical in form and extending from the casting 31 upward to the upper end of the inner pair of shells 16 and 18 and disposed, of course, in the space between the shells 18 and 21. Mica 40 is used for insulating purposes and the heating element is electrically connected by bus-bars 41 to terminals 42. These bus-bars at their lower ends are insulated by fiber tubing 43 and the bus-bars or other electrical connections extend through this fiber tubing and are electrically connected to the outwardly projecting pins or male members 44 which are held to a fiber base 45 by means of screws 46 with which the electric wires or bus-bars are connected. The base 14 is formed to provide a socket 47, and fitting in this socket is the ordinary plug 48 of hard fiber or other insulating material formed with recesses 49 into which the pins 44 project. Suitable electrical connections are carried by this plug and extend to a source of current so that when the plug is in place an electric current will pass through the pins 44, the bus-bars and through the heating element 39.

Preferably the outermost shell 22 is covered with a heat insulating cover of asbestos, designated 50. This asbestos covering, of course, conforms to the contour of the outermost shell and extends downward to the casting 31 and upward to the upper end of the outermost shell 22. This covering of asbestos is held in place at its lower end by a metal sleeve retainer 51 and at its upper end by a metallic sleeve retainer 52.

The operation of this heater is as follows: Water fills the pipes 13, 10 and 15 and may continuously flow therethrough. A portion of this water is taken away through the by-pass 34 and the ports 28 and carried to the spaces between the shells 16 and 18 and 20 and 21. These relatively thin or shallow currents of water are carried up in a helical direction around the shells and in more or less close contact with the heating element disposed between the two pairs of shells. Thus this water becomes highly heated and vaporized and the water has a relatively long path of travel adjacent to the heating element so that when the water has reached the upper portions of the cylindrical shells it has been brought to a point of vaporization and steam will be discharged through the ports 25 and 26 into the upper portion of the pipe 10 and the lower portion of pipe 15. this steam being discharged into the water column and serving to heat the water that is flowing through the pipe 10. By actual experience it has been found that this secures a very rapid circulation and a relatively high degree of efficiency for the amount of electrical energy expended. It will be seen that this heater may be readily connected up at any time with ordinary house sources of electricity, it is very compact, simple, and cannot readily get out of order. Obviously the hot water between the inner pair of shells will to some extent act to warm the water flowing upward through the pipe 10.

In Figure 5, I show a preferable manner of arranging the heating element around the shell 18 and preferably the heating element is arranged in two sections 39ª and 39ᵇ, the first section of the heating element being included in one circuit, the second section of the heating element being included in another circuit, and the element in the first circuit being wound four times to the inch, while the element in the second circuit is wound six times to the inch. To this end, I have provided the bus-bars 41ª, 41ᵇ and 41ᶜ. The bus-bars 41ª extend from the terminal for the wire 39ª to the terminal for the wire 39ᵇ, the bus-bar 41ᶜ extends from the terminal for the heating element 39ᵇ to the terminal for the heating element 39ª, and the bus-bar 41ᵇ connects its terminal 56 with the terminal 55. These two terminals are then connected by the conductors 42 to the terminal pins 44. The bus-bars are insulated from the heating elements except at the terminals by means of mica insulation. As heretofore stated, I do not wish to be limited to any particular form of this heating element, nor to any particular arrangement of the heating element, as heating elements of various forms might be used.

The particular advantage of my invention lies in the fact that only a small amount of water is withdrawn from the central pipe into the two water spaces and there the flow of water is retarded and the water held in contact with the heating element long enough for the water to become thoroughly vaporized before it reaches the outlets at the upper end. I find by actual experiment that water when brought to the vaporizing point takes the form of steam and expands very rapidly and in this state absorbs the heat units to a very much greater degree in the same given time than it would as a liquid. While expanding and in the form of superheated steam, it has a much larger area than where admitted to the water heating spaces and consequently contains that many more heat units, superheated steam under 90 pounds pressure carrying 1175° of heat. By converting the water into steam and turning said steam back into the central water pipe and causing the steam to condense on coming in contact with the cold water in the central pipe, the steam will give up its heat units to such an extent that it immediately raises the temperature of the water in the central pipe to a very high degree, thus doing in one circulation what the ordinary heater would take in a half dozen turns of the water heater to gain. Actual tests have shown that the heater herein described works eight times as fast as other heaters using the same amperage. Further advantages in my invention reside in the simplicity of its assembly and the ease with which repairs may be made.

While I have illustrated certain details of construction and arrangement of parts, it is obvious that I do not wish to be limited thereto as these may be changed in many ways without departing from the spirit of the appended claims.

I claim:—

1. A heater including a central flow pipe connected to a source of water, a pair of outer and inner shells concentric to the flow pipe spaced from each other and formed to provide a passageway between the shells and one end of the space between the shells being connected to the inlet end of the flow pipe and the opposite end of the space between the shells being connected to the adjacent end of the flow pipe, and an electrically energized heating element disposed against one of said shells.

2. A heater including a central flow pipe connected to a source of water, an outer pair of spaced shells, an inner pair of spaced shells, both of said pairs of shells being concentric to the flow pipe, the space between each pair of shells being connected at their opposite ends to adjacent ends of the flow pipe whereby water may enter from the flow pipe, pass up between said shells, and vaporized water may be discharged into the other end of the flow pipe, and an electrically energized heating element disposed between the pairs of shells and in close contact therewith, means being provided between the shells for obstructing the flow of water.

3. A heater of the character described including a centrally disposed flow pipe connected to a source of water, outer and inner pairs of shells disposed concentric to the flow pipe, each pair of shells being spaced from each other and each pair of shells being formed to provide a helical passage extending from one end of the shells to the other, one end of each pair of shells being connected to the interior of the flow pipe at the inlet end and the opposite end of the space between each pair of shells being connected at the end of the flow pipe, and an electrically energized heating element disposed between and in close contiguity with the pairs of shells.

4. A heater of the character described including a centrally disposed flow pipe connected to a source of water, outer and inner pairs of shells disposed concentric to the flow pipe, each pair of shells being spaced from each other and each pair of shells being formed to provide a helical passage extending from one end of the shells to the other, one end of each pair of shells being connected to the interior of the flow pipe at the inlet end and the opposite end of the space between each pair of shells being connected at the end of the flow pipe, an electrically energized heating element disposed between and in close contiguity with the pairs of shells, the heater at its inlet end being formed with a base supporting said pairs of shells and the heating element having electrical connections extending into said base and formed to provide projecting terminals, and means insertible into said base for electrically engaging said terminals with a source of current.

5. A heater of the character described including a centrally disposed flow pipe connected to a source of water, a base mounted upon said flow pipe and formed to provide a socket, an inner pair of cylindrical metallic shells extending around the flow pipe and operatively supported at their lower ends upon the base, said shells being formed to provide ports extending into the inlet end of the flow pipe and at the other end discharging into the outlet end of the flow pipe, an outer pair of metallic shells supported upon said base and spaced from each other, the space between the outer pair of shells being operatively connected to the flow pipe at its outlet end, the base being formed to provide a by-pass leading from the flow pipe into the space between the outer pair of shells, both pairs of shells being formed to provide a helical passageway extending the full length of each pair of shells, an electrically energized heating element disposed in the space between the pairs of shells and in intimate contact therewith, the electrically energized heating element having bus-bars extending into said socket, pin terminals connected to said bus-bars and disposed centrally of the socket, and a plug engageable in the socket and having recesses to receive said plug, and electrical connections extending from the plug.

6. A heater comprising a centrally disposed flow pipe, a heating element surrounding the flow pipe and spaced therefrom, and means for conducting a portion of the water from the flow pipe into heating engagement with the heating element to thereby vaporize the water, and conducting the steam from the water back into the flow pipe.

7. A heater comprising a central flow pipe, a plurality of heating chambers extending concentrically to the flow pipe, means for conducting a portion of the water from the inlet end of the flow pipe into said heating chambers to thereby vaporize the water in said chambers, and conducting the steam generated within the chambers into the outlet end of the flow pipe, and means for heating the water in said chambers.

8. In a water heater, a central flow pipe, a chamber disposed concentrically to the flow pipe and having a port at its inlet end opening into the flow pipe and a port at its outlet end opening into the flow pipe, means for causing the water in said chamber to travel in a helical course through said chamber from its inlet end toward its outlet end, and means for causing the vaporization of the water in said chamber.

9. A heater of the character described including a supporting base, a centrally disposed flow pipe mounted upon said base, the base having means for connecting the flow pipe to a source of liquid, outer and inner metallic shells operatively supported upon the base and disposed concentric to the flow pipe, the shells being spaced from each other and one of said shells being corrugated to form a helical passageway from the inlet end of the space to the outlet end thereof, one end of said space being connected to the interior of the flow pipe, the opposite end of said space being also connected to the interior of the flow pipe, an electrically energized heating element disposed in contiguity with one of said shells to heat the water in said space, the base being formed with a socket and the heating element having electrical connections extending into said socket, and a terminal-carrying plug adapted to be inserted in said socket with its terminals in electrical connection with the electrical connections of the heating element.

10. A heater of the character described comprising a base, a centrally disposed flow tube mounted upon said base, the base being formed to provide a water connection to the lower end of said flow tube, the water connection extending from the upper end of said flow tube, a pair of spaced metallic shells disposed concentrically to the flow tube and operatively supported upon the base, the shells being spaced from each other and formed to provide a helical passageway, the lower and upper ends of the space being connected to the flow tube whereby to permit the inlet of water to said space and the outlet of steam therefrom, an outer pair of spaced metallic shells concentric to the inner pair of shells and formed to provide a helical passageway, the space between the outer pair of shells being operatively connected to the flow tube to permit the discharge of steam therefrom, a cap detachably resting upon the base and having a chamber formed with a port leading into the space between said outer pair of shells, a by-pass pipe formed in said base and operatively connected to the said chamber at one end and at its opposite end opening into the flow pipe, an electrically energized heating element disposed between said pairs of shells and having electrical connections leading therefrom, the base being formed with a socket into which said electrical connections extend, pin terminals disposed within said socket and connected to said electrical connections, the socket being adapted to receive a plug electrically engaging with the terminals and supplying energy thereto, and an outer covering of insulating material extending over the outer shell.

11. A heater of the character described comprising a water pipe, a water vaporizer disposed immediately adjacent the water pipe, and means for carrying a portion of the water from the water pipe into the vaporizer and then carrying the steam from the vaporizer into the current of water in the water pipe to thereby cause the heating of the water and water pipe.

12. A heater of the character described including a central water pipe through which the water flows, a water heater and vaporizer surrounding the water pipe, means for conducting a portion of the water from the water pipe at one end into the heater and vaporizer to thereby cause the vaporization of this water, and means for carrying the steam so generated back into the water pipe and intermingling it with the water to heat the same.

In testimony whereof I hereunto affix my signature.

LESLIE M. ADAMS.